Patented Feb. 9, 1954

2,668,823

UNITED STATES PATENT OFFICE 2,668,823

ETHYLXANTHOYLTHIOXY-CYANO-METHYL-PHOSPHINE OXIDE

Henry Tolkmith, Midland, Mich., assignor to The Dow Chemical Company, Midland, Mich., a corporation of Delaware No Drawing. Application April 21, 1953,
Serial No. 350,236

1 Claim. (Cl. 260—455)

The present invention is directed to ethylxanthoylthioxy-cyano-methyl - phosphine oxide of the formula

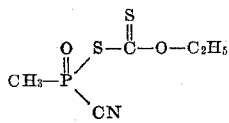

This compound is a viscous oil, some soluble in many organic solvents and substantially insoluble in water. It is of value as an intermediate for the preparation of more complex phosphorus derivatives and as a toxic constituent of parasiticide compositions.

The new compound may be prepared by reacting at least one molecular proportion of sodium cyanide with one molecular proportion of S-(ethlyxanthoyl) methanethiolphosphonic chloride of the formula

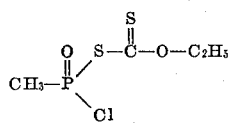

in an inert organic solvent such as benzene.

In carrying out the reaction, the sodium cyanide and S-(ethylxanthoyl) methanethiolphosphonic chloride are dispersed in the solvent and the resulting mixture heated for a period of time at a temperature of from 40° to 80° C. As the desired product has a tendency to decompose at temperatures above 80° C., temperatures substantially in excess of 80° C. for any appreciable period of time should not be employed. Upon completion of the reaction, the mixture may be filtered and the filtrate distilled under reduced pressure at gradually increasing temperatures up to a temperature of 80° C. to separate low boiling constituents and to obtain as a residue the desired ethylxanthoylthioxy - cyano-methyl-phosphine oxide.

The S - (ethylxanthoyl) methanethiolphosphonic chloride employed as a starting material in the above-described method may be prepared by reacting one molecular proportion of sodium ethylxanthate with one molecular proportion of methanephosphonic dichloride in an inert organic solvent such as benzene. In carrying out the reaction, the sodium ethylxanthate is added with stirring to the methanephosphonic dichloride dispersed in the solvent and the resulting mixture heated for a period of time at a temperature of from 35° to 80° C. To avoid decomposition, temperatures substantially in excess of 80° C. for any appreciable period of time should not be employed. Upon completion of the reaction, the mixture may be filtered and the filtrate concentrated by distillation under reduced pressure to a temperature up to 80° C. to obtain as a residue the desired S-(ethylxanthoyl) methanethiolphosphonic chloride. This product is a viscous oil having a density of 1.245 at 20° C. The latter compound and described method for its preparation constitute the subject matter of my copending application Serial No. 203,759, filed December 30, 1950.

In a representative preparation, 2.5 grams (0.051 mole) of sodium cyanide was added to 8.35 grams (0.038 mole) of S-(ethylxanthoyl) methanethiolphosphonic chloride dispersed in 50 milliliters of benzene and the resulting mixture heated for 2 hours at a temperature of 60° C. At the end of this period, the mixture was filtered and the filtrate concentrated by distillation under reduced pressure to a temperature up to 70° C. to obtain as a residue the desired ethylxanthoylthioxy - cyano-methyl-phosphine oxide. The latter is a viscous oil having a density of 1.239 at 18° C.

The new ethylxanthoylthioxy-cyano-methyl-phosphine oxide product is effective as a parasiticide and adapted to be employed for the control of a wide range of agricultural and household pests such as flies, mites, aphids, beetles and cockroaches. For such use, the compound may be dispersed on an inert finely divided solid and employed as a dust. Also, such mixtures may be dispersed in water with the aid of a dispersing and wetting agent and the resulting aqueous suspensions employed as sprays. In other procedures, the new product may be employed in oils, as a constituent in oil-in-water emulsions, or in water dispersion with or without the addition of emulsifying, wetting or dispersing agents. Suitable concentrations of the toxicant in dusts are in the order of from about 0.1 to 10 percent by weight of the dust and in liquid suspensions from about 0.1 to 3 pounds per 100 gallons of the spray mixture.

In representative operations against flies and cockroaches, 100 percent kills of these pests are obtained with dust compositions containing 4.5 percent by weight of the toxic ethylxanthoylthioxy-cyano-methyl-phosphine oxide.

This is a continuation in part of my copending application Serial No. 203,764, filed December 30, 1950.

I claim:
Ethylxanthoylthioxy - cyano - methyl - phosphine oxide.

HENRY TOLKMITH.

No references cited.